(12) United States Patent
Dym et al.

(10) Patent No.: US 11,039,273 B1
(45) Date of Patent: Jun. 15, 2021

(54) METHOD AND SYSTEM FOR GENERATING GEOFENCES USING AN ITERATIVE PROCESS

(71) Applicant: INTUIT INC., Mountain View, CA (US)

(72) Inventors: Jacob Wesley Dym, Mountain View, CA (US); Akshay Kansal, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 16/823,989

(22) Filed: Mar. 19, 2020

(51) Int. Cl.
  *H04W 4/021* (2018.01)

(52) U.S. Cl.
  CPC .................. *H04W 4/022* (2013.01)

(58) Field of Classification Search
  None
  See application file for complete search history.

(56) References Cited

U.S. PATENT DOCUMENTS

| | | | |
|---|---|---|---|
| 9,706,355 B1* | 7/2017 | Cali | H04W 4/022 |
| 2011/0112768 A1* | 5/2011 | Doyle | G09B 29/10 |
| | | | 701/300 |
| 2015/0346968 A1* | 12/2015 | Johnson | G06F 3/14 |
| | | | 715/771 |
| 2017/0289754 A1* | 10/2017 | Anderson | H04W 4/029 |
| 2019/0313204 A1* | 10/2019 | Ayoub | H04W 4/35 |
| 2020/0037102 A1* | 1/2020 | Zhang | G06F 16/2246 |
| 2020/0288269 A1* | 9/2020 | Bartucci | H04W 4/023 |
| 2021/0058735 A1* | 2/2021 | Wirola | H04W 4/021 |

* cited by examiner

*Primary Examiner* — German Viana Di Prisco
(74) *Attorney, Agent, or Firm* — Patterson + Sheridan, LLP

(57) ABSTRACT

Certain aspects of the present disclosure provide techniques for generating geofences for an address using an iterative process. An example method generally includes receiving an address to generate a geofence around. A position associated with the received address is obtained from a map service. A set of perimeter points is generated for the received address. Each perimeter point is associated with a latitude and longitude position determined based on a traversal direction and an iteratively determined distance from the obtained position associated with the received address. A geofence is generated for the received address based on the set of perimeter points.

20 Claims, 12 Drawing Sheets

| Address | Latitude | Longitude | Perimeter | Heading | New_Latitude | New_Longitude | New_Address |
|---|---|---|---|---|---|---|---|
| 1400 Bronco Ln, Boise, ID 83706 | 43.6028387 | -116.1967873 | 10 | North | 43.60283981 | -116.1967858 | 1400 Bronco Ln, Boise, ID 83706 |
| 1400 Bronco Ln, Boise, ID 83706 | 43.6028387 | -116.1967873 | 20 | North | 43.60284092 | -116.1967842 | 1400 Bronco Ln, Boise, ID 83706 |
| 1400 Bronco Ln, Boise, ID 83706 | 43.6028387 | -116.1967873 | 40 | North | 43.60284314 | -116.1967812 | 1400 Bronco Ln, Boise, ID 83706 |
| 1400 Bronco Ln, Boise, ID 83706 | 43.6028387 | -116.1967873 | 80 | North | 43.60284758 | -116.196775 | 1400 Bronco Ln, Boise, ID 83706 |
| 1400 Bronco Ln, Boise, ID 83706 | 43.6028387 | -116.1967873 | 160 | North | 43.60285646 | -116.1967628 | 1400 Bronco Ln, Boise, ID 83706 |
| 1400 Bronco Ln, Boise, ID 83706 | 43.6028387 | -116.1967873 | 320 | North | 43.60287422 | -116.1967382 | 1400 Bronco Ln, Boise, ID 83706 |
| 1400 Bronco Ln, Boise, ID 83706 | 43.6028387 | -116.1967873 | 640 | North | 43.60290975 | -116.1966892 | 1400 Bronco Ln, Boise, ID 83706 |
| 1400 Bronco Ln, Boise, ID 83706 | 43.6028387 | -116.1967873 | 1280 | North | 43.6029808 | -116.1965911 | 1400 Bronco Ln, Boise, ID 83706 |
| 1400 Bronco Ln, Boise, ID 83706 | 43.6028387 | -116.1967873 | 2560 | North | 43.60312289 | -116.1963948 | 1910 W University Dr, Boise, ID 83706 |
| 1400 Bronco Ln, Boise, ID 83706 | 43.6028387 | -116.1967873 | 1920 | North | 43.60305184 | -116.196493 | 1910 W University Dr, Boise, ID 83706 |
| 1400 Bronco Ln, Boise, ID 83706 | 43.6028387 | -116.1967873 | 1600 | North | 43.60301632 | -116.1965542 | 1910 W University Dr, Boise, ID 83706 |
| 1400 Bronco Ln, Boise, ID 83706 | 43.6028387 | -116.1967873 | 1440 | North | 43.60299856 | -116.1965665 | 1910 W University Dr, Boise, ID 83706 |
| 1400 Bronco Ln, Boise, ID 83706 | 43.6028387 | -116.1967873 | 1360 | North | 43.60298968 | -116.1965788 | 1400 Bronco Ln, Boise, ID 83706 |

Adding Larger Distances | Adding Smaller Distances

FIG. 6

METHOD AND SYSTEM FOR GENERATING GEOFENCES USING AN ITERATIVE PROCESS

INTRODUCTION

Aspects of the present disclosure generally relate to generating geofences for geographic areas, and more specifically to generating geofences around addresses in a geographic area that approximate the boundaries of properties associated with the addresses.

BACKGROUND

Geofences are generally virtual boundaries defined around a given location in a geographic area (e.g., a latitude/longitude coordinate, a street address, etc.). Areas inside the geofence may be considered areas associated with the given location, and areas outside the geofence may considered areas not associated with the given location (e.g., associated with one or more other locations). Actions may be performed in a computing system based on a user presence relative to a geofence. Generally, a first set of actions may be performed if a user is within the perimeter of the geofence or moves into the area defined by the geofence, and a second set of actions may be performed if the user is outside of the perimeter of the geofence or otherwise exits the area defined by the geofence.

Geofences may be defined according to varying techniques. One simple technique may be to define a geofence for a given location based on a defined radius from a defined point (e.g., a defined latitude/longitude coordinate returned from a map service as the latitude/longitude coordinate associated with an address). The resulting geofence may be a circle surrounding the defined point. However, because the boundaries of few properties or geographical areas are circular in nature, the resulting geofence may be inaccurate. For example, assume that a property around which a geofence is built has longer dimensions along the vertical axis (e.g., north-south) than along the horizontal axis (e.g., east-west). A geofence defined with a radius of half the length of the vertical dimension may thus include a significant amount of space that is outside of the east/west boundaries of the property. Meanwhile, a geofence defined with a radius of half the length of the horizontal dimension may exclude portions of the property north and south of the geofence. In other cases, where a property has an irregular border, generating a geofence using a defined radius from a defined point may include areas that are not part of the property and exclude areas within the boundaries of the property.

To generate more accurate geofences, geofences may be defined manually. However, manual generation of geofences may be impractical for any sort of automated software application. Defining a base set of geofences may be a time consuming process. Further, property boundaries may change over time (e.g., due to consolidation of tracts into larger tracts or division of tracts into a plurality of smaller tracts). As these boundaries change, existing geofences may need to be manually deleted or modified, and additional geofences may be manually defined and added for use in a computing system.

Accordingly, techniques are needed to automatically generate geofences that approximate property boundaries for use in a computing system.

BRIEF SUMMARY

Certain embodiments provide a computer-implemented method for generating a geofence iteratively from a position associated with an address. The method generally includes receiving an address to generate a geofence around. A position associated with the received address is obtained from a map service. A set of perimeter points is generated for the received address. Each perimeter point is associated with a latitude and longitude position determined based on a traversal direction and an iteratively determined distance from the obtained position associated with the received address. A geofence is generated for the received address based on the set of perimeter points.

Other embodiments provide a system comprising a processor and a non-transitory computer-readable memory storing instructions that, when executed by the processor, perform an operation for generating a geofence iteratively from a position associated with an address. The operation generally includes receiving an address to generate a geofence around. A position associated with the received address is obtained from a map service. A set of perimeter points is generated for the received address. Each perimeter point is associated with a latitude and longitude position determined based on a traversal direction and an iteratively determined distance from the obtained position associated with the received address. A geofence is generated for the received address based on the set of perimeter points.

Still further embodiments provide a computer-implemented method for tracking user activity based on iteratively generated geofences. The method generally includes receiving an address to generate a geofence around. A position associated with the received address is obtained from a map service. A set of perimeter points is generated for the received address. Each perimeter point in the set of perimeter points is associated with a direction to traverse from the obtained position associated with the received address. For each perimeter point in the set of perimeter points, until the map service indicates that the perimeter point is associated with an address that is different from the received address, a distance is increased from the obtained position based on a first delta value, the perimeter point is moved based on the distance from the obtained position and the direction to traverse associated with the perimeter point, and an indication of a first address associated with the perimeter point is obtained from the map service. A distance is selected as the distance from the obtained position having a longest distance from the obtained position and being associated with the received address. Until the map service indicates that the perimeter point is associated with the received address, a second delta value to add to the selected distance is decreased, the perimeter point is moved based on the selected distance, the second delta, and the direction to traverse associated with the perimeter point, and an indication of a second address associated with the perimeter point is obtained from the map service. The geofence is generated for the received address based on the set of perimeter points.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 6 illustrates an example data set used to identify a perimeter point for a property for use in generating a geofence that approximates the boundaries of the property at the address.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
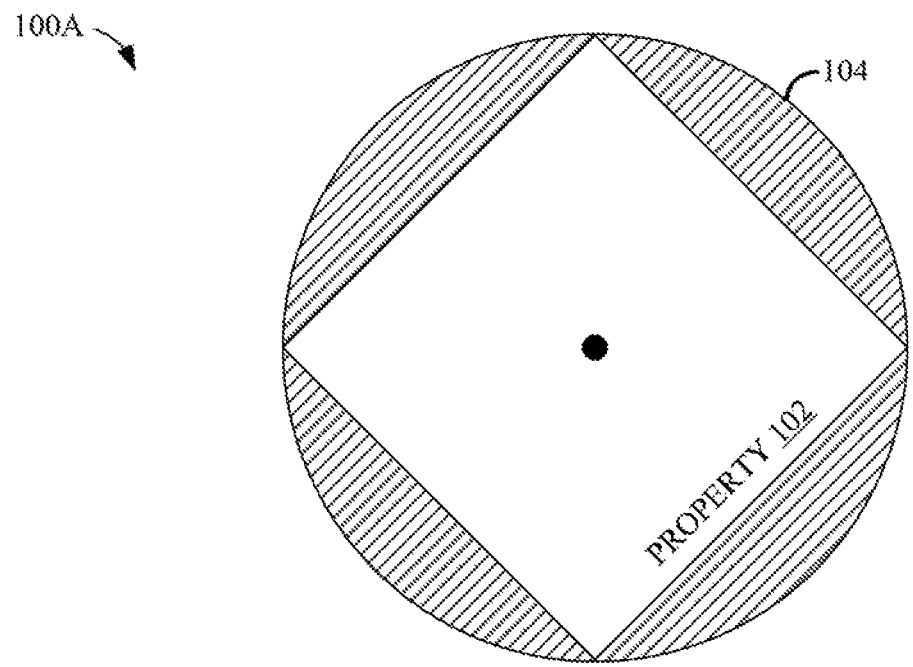
FIGS. 1A-1J illustrates example generation of geofences for a property.
Figure 1B:
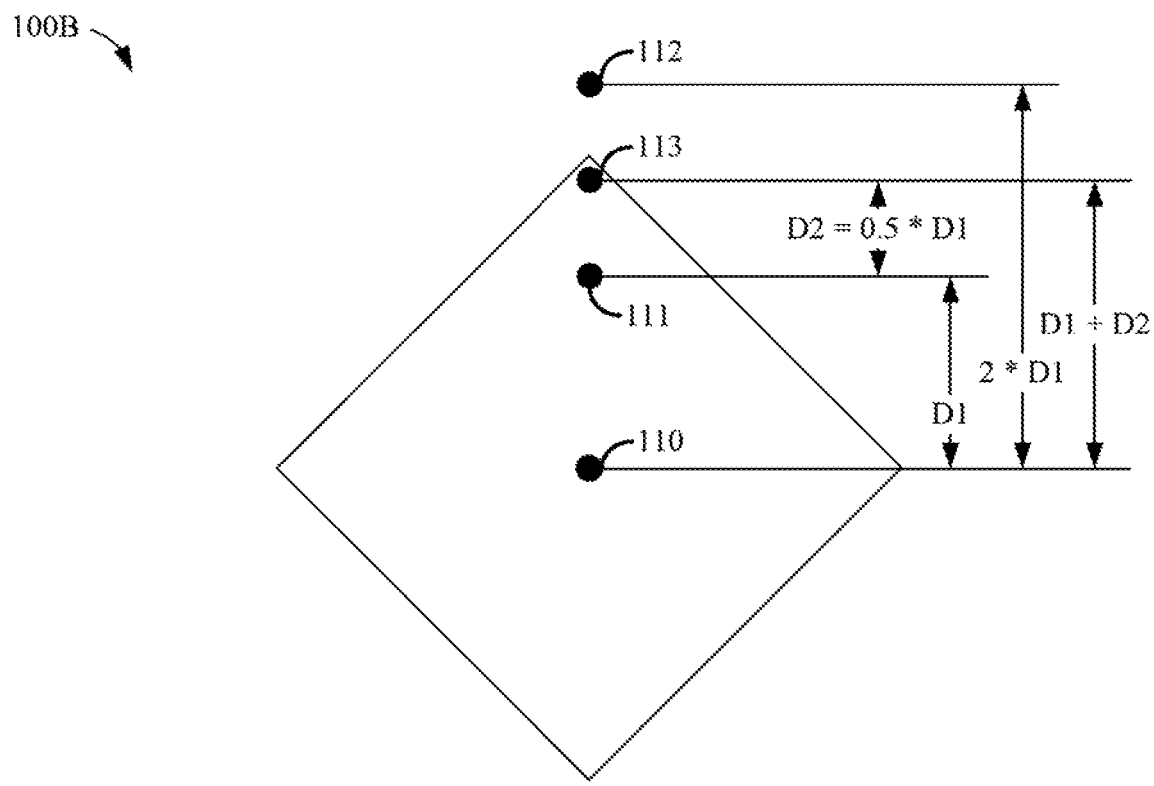
Figure 1C:
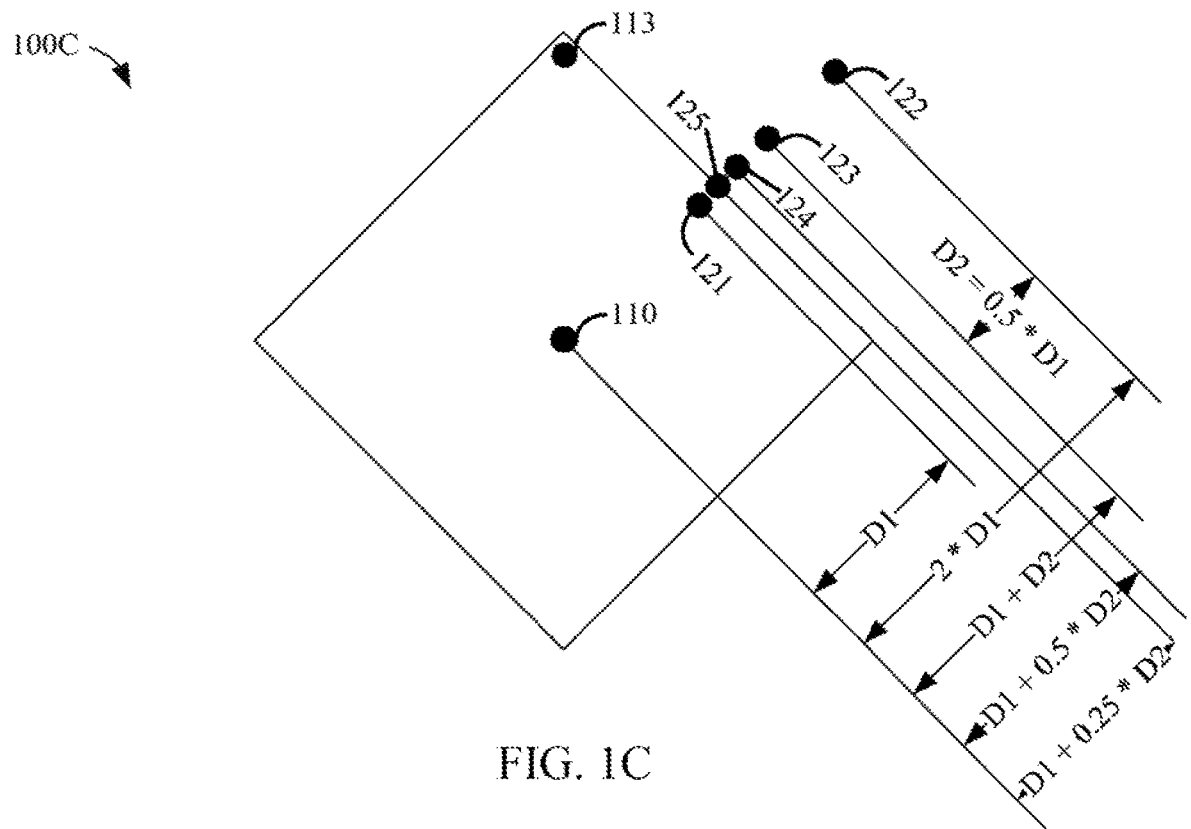
Figure 1D:
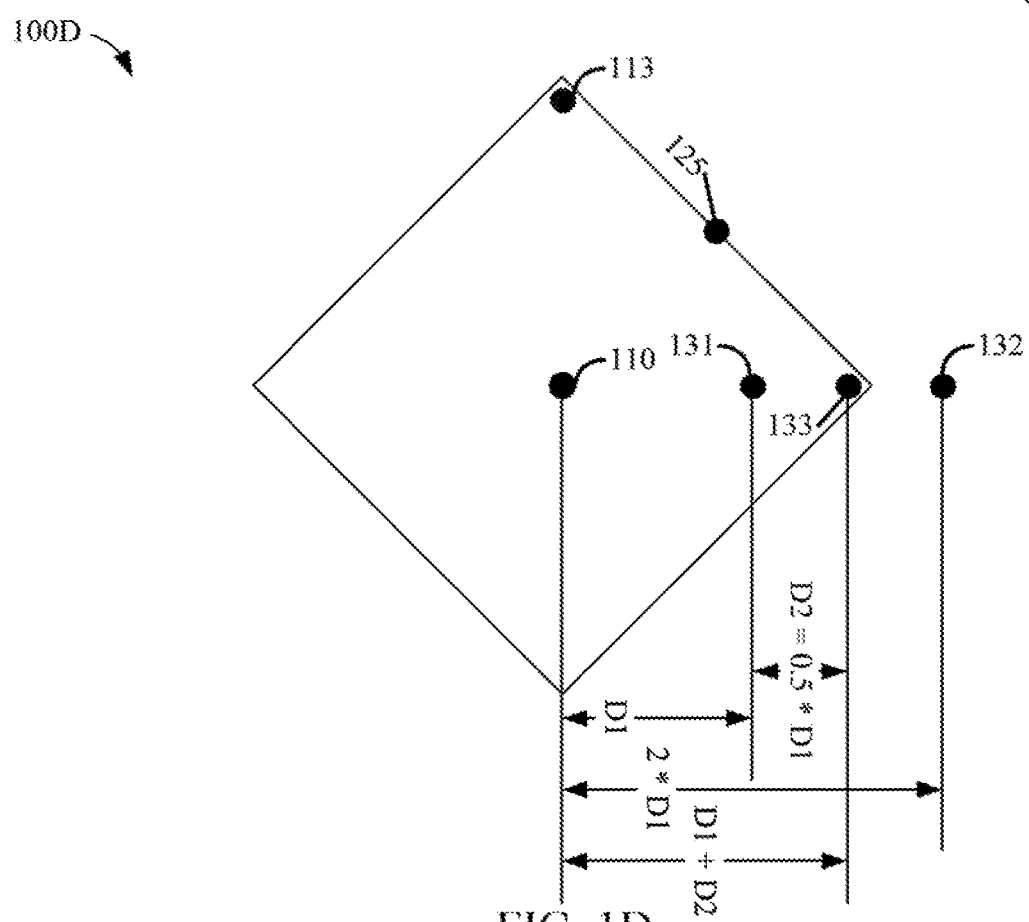
Figure 1E:
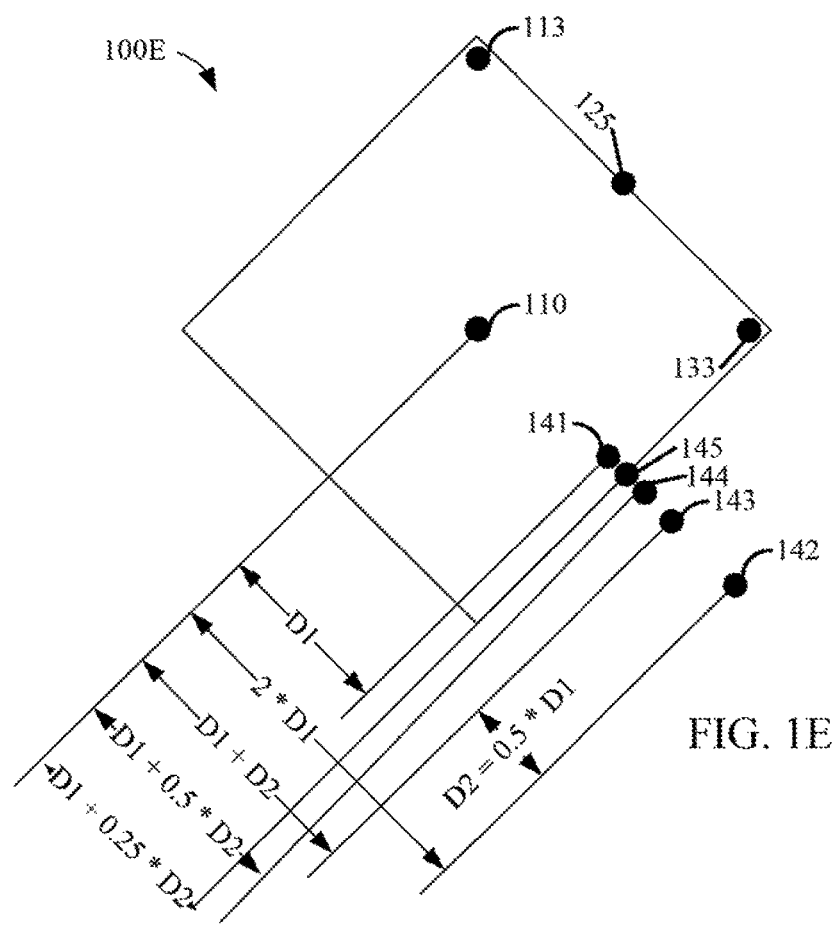
Figure 1F:
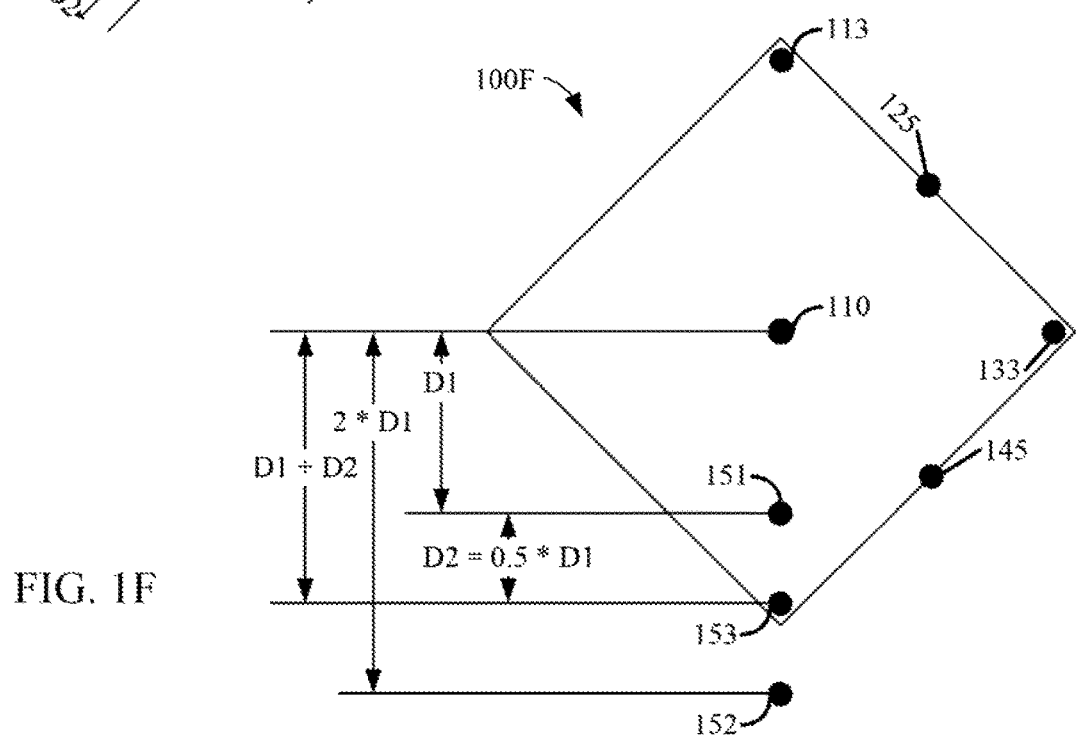
Figure 1G:
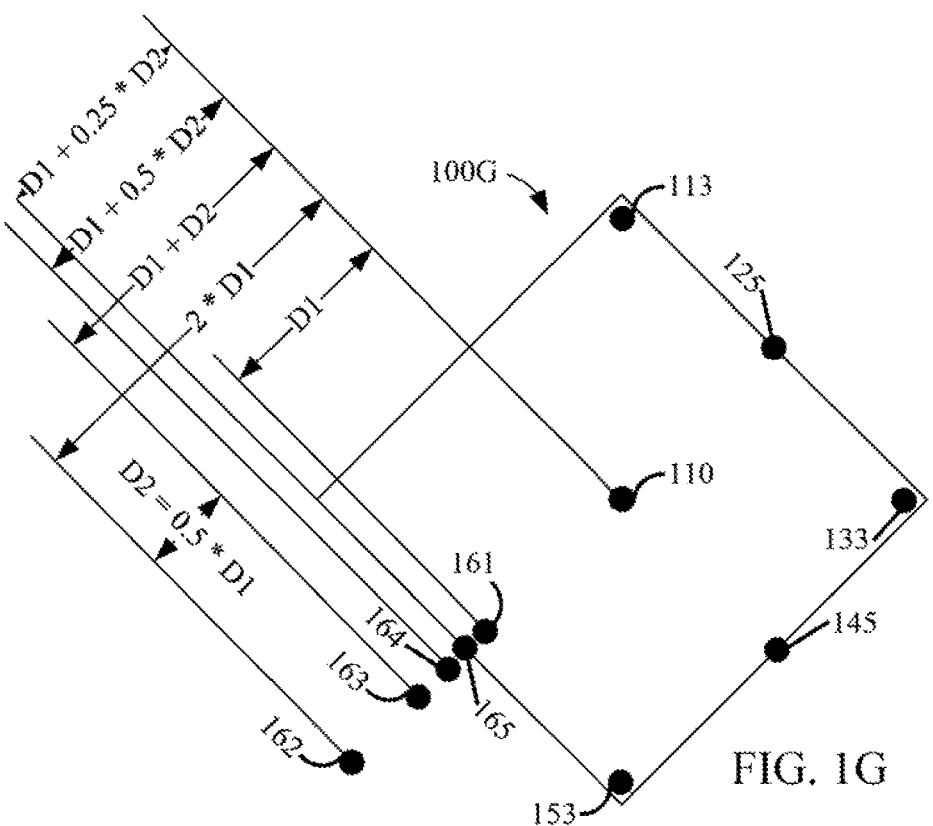
Figure 1H:
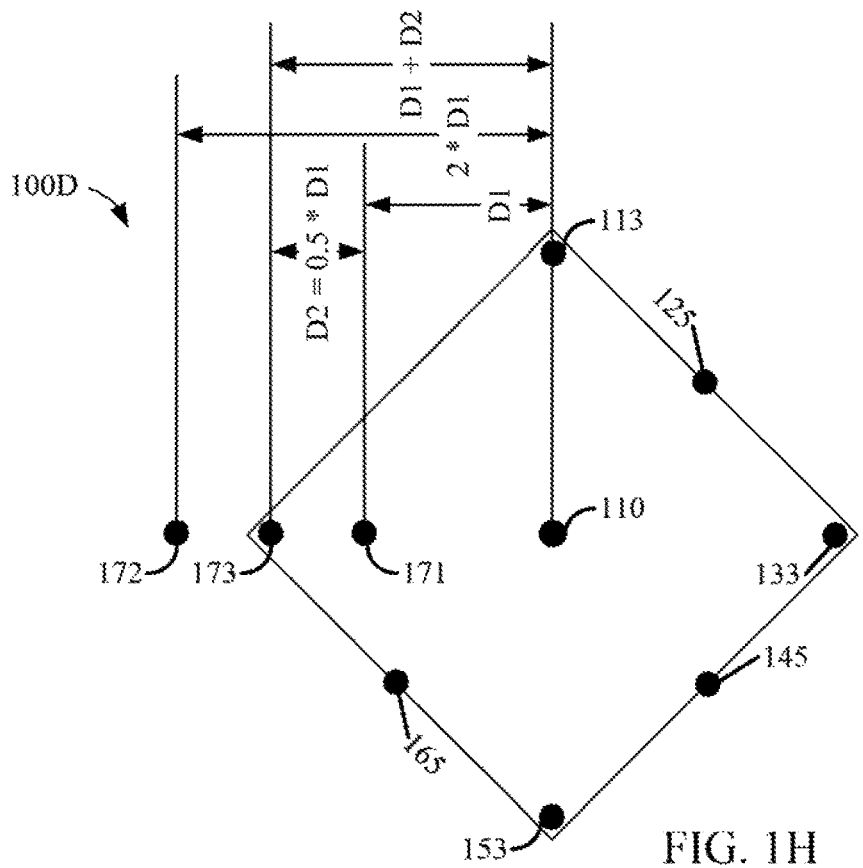
Figure 1I:
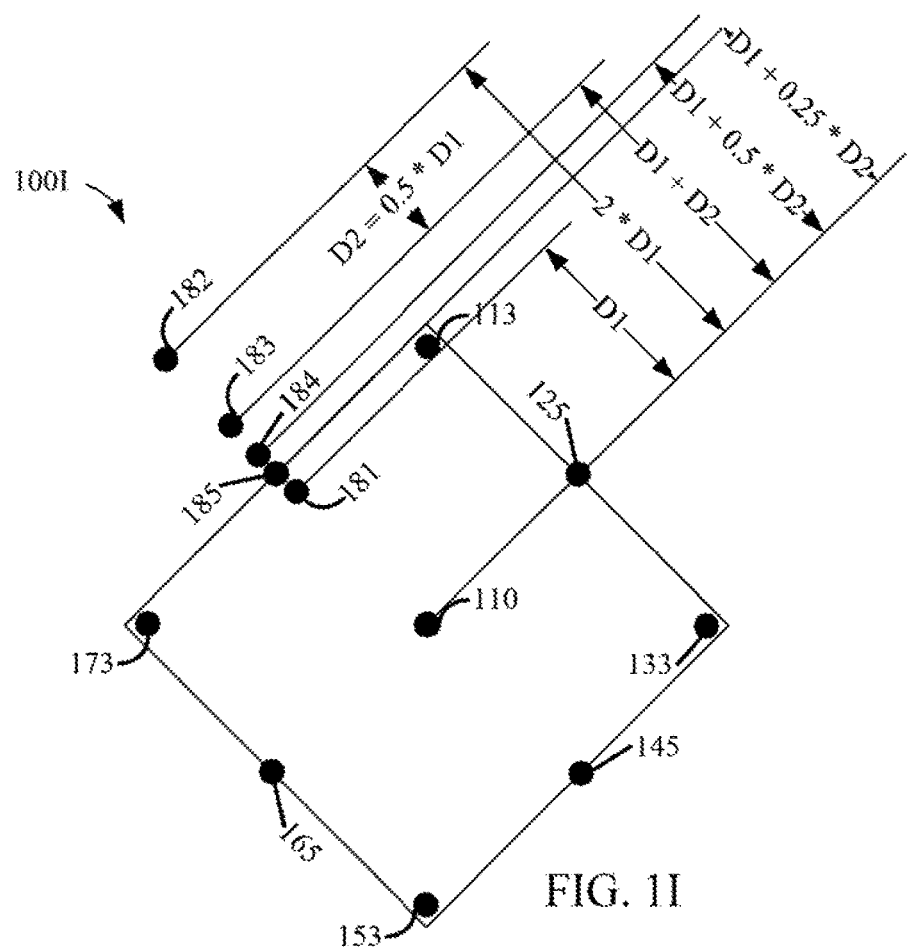
Figure 1J:
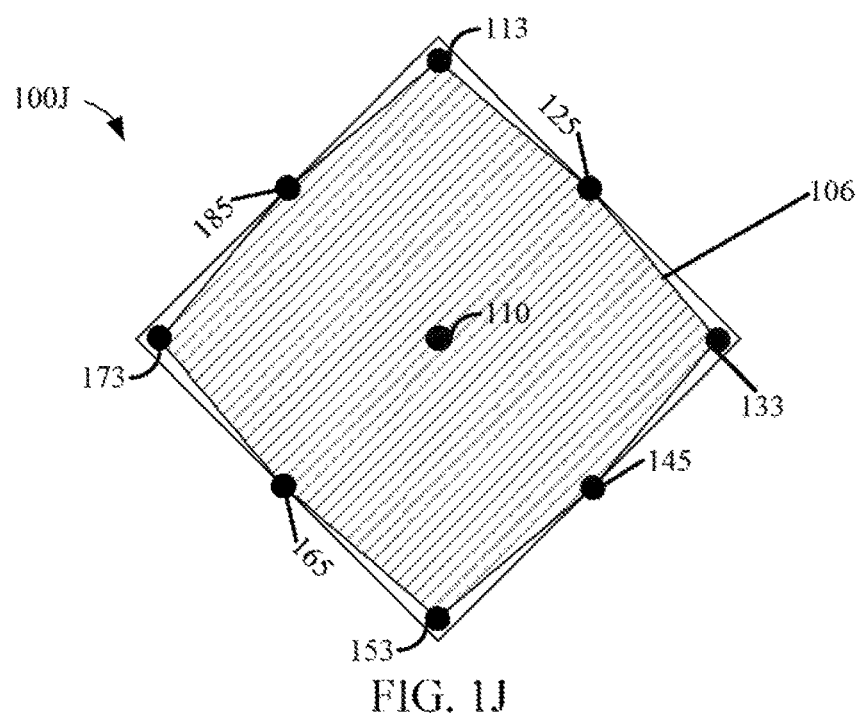

Aspects of the present disclosure provide apparatuses, methods, processing systems, and computer readable mediums for generating geofences approximating the boundaries of a property at an address using an iterative process.

Geofences can be used for various purposes. For example, geofences and position information reported by a mobile device (e.g., latitude/longitude coordinates determined by a satellite positioning system (NAVSTAR GPS, GALILEO, GLONASS, etc.) and reported by the mobile device) can be used to initiate or discontinue operations with respect to a user of the mobile device. In messaging systems that use navigation information, these geofences may define, for example, a geographical area in which different messages may be presented to a user so as to avoid providing irrelevant messages to the user. In another example, in a time tracking or activity tracking application, geofences and position information may be used to initiate tracking when a user enters the geofence and discontinue tracking when the user exists the geofence.

As discussed, building geofences associated with real-world properties may involve various complications. Simple radius-based geofences rarely match or even approximate the actual perimeter of a real-world property and thus may include space that is outside the boundaries of the real-world property and/or not include space that is within the boundaries of the real-world property. This inaccuracy may complicate various processes that are based on determining whether a user is located at a specific property or location or crossing a threshold into or out of a defined geofence, as additional processing may be needed to determine if the user is within or outside of a portion of the geofence that overlaps with the property boundaries. More accurate geofences may be generated by manually defining geofences for a given property. However, manual definition of geofences may be a time consuming task, may not leverage existing property/parcel boundary information, and may not be able to quickly respond to changes in property boundaries.

Embodiments presented herein may improve the maintainability and accuracy of geofences by generating geofences that more closely approximate the actual boundaries of a property using an iterative process. Geofences may be defined as a set of perimeter points having a distance and direction offset relative to a defined position within a property associated with a given address. This defined position may be, for example, a center position of the property associated with a given address or an arbitrarily selected position within the property associated with the given address. Each perimeter point may be set iteratively by increasing a distance of the perimeter point from the defined position, then from a perimeter point associated with the greatest distance from the defined position that is still associated with the given address, adding iteratively smaller amounts until a point is identified that is associated with the given address. The perimeter points may be connected to generate a geofence, and the shape of the generated geofence may be based on connections between adjacent perimeter points and the shape of the property for which the geofence is generated. As property boundaries change, the geofence may be updated using the processes described herein for generating a geofence, which may be useful in identifying the boundaries of geofences in systems where a mapping application programming interface (API) returns an address for any input coordinate but does not provide the actual boundaries of any given address.

Example Geofences Generated for a Property

FIG. 1 illustrates examples 100 of generating geofences for a property 102. As illustrated, example 100A illustrates the generation of a geofence 104 based on a radius from a defined position within the boundaries of property 102, and example 100J illustrates the generation of a geofence 106 based on the iterative process described herein. While geofences 104 and 106 are illustrated relative to a center position of property 102, it should be recognized that any arbitrary latitude/longitude position within property 102 may be used to generate geofences 104 and 106.

As illustrated, geofence 104 is generated as a circular geofence having a radius defined from a defined position in the property 102. In this example, property 102 may be surrounded in its entirety by geofence 104. However, because the radius used to generate geofence 104 is generally larger than half of the length of a side of property 102, geofence 104 may cover property 102 and parts of other properties (as indicated by the hatched area). Further, in examples where property 102 has an irregular boundary (though not illustrated), portions of property 102 may not be covered by geofence 104. Thus, a geofence generated as a circular geofence may not, and generally will not, accurately represent the boundaries of property 102.

Geofence 106, however, is generated using an iterative process along a number of directions from center position 110. Center position 110 generally represents a latitude/longitude position that may be returned from a mapping service as a position associated with the address of property 102. As illustrated, geofence 106 is generated using perimeter points, defined as latitude/longitude points, located on various directional bearings and various distances from the center position 110. In one embodiment, directional bearings may be defined with bearing 000 representing a due north trajectory, 090 representing a due east trajectory, 180 representing a due south trajectory, and 270 representing a due west trajectory.

Examples 100B-100I illustrate the determination of perimeter points used to generate geofence 106. Example 100B depicts the determination of perimeter points located along a directional bearing of 000; example 100C depicts the determination of perimeter points located along a directional bearing of 045; example 100D depicts the determination of perimeter points located along a directional bearing of 090; example 100E depicts the determination of perimeter points located along a directional bearing of 135; example 100F depicts the determination of perimeter points located along a directional bearing of 180; example 100G depicts the determination of perimeter points located along a directional bearing of 225; example 100H depicts the determination of perimeter points located along a directional bearing of 270; and example 100I depicts the determination of perimeter points located along a directional bearing of 315. It should be recognized, however, that any number of bearings and perimeter points may be used to generate a geofence using the techniques described herein. Perimeter points identified along a larger number of directional bearings may provide for greater fidelity to the real-life boundaries of a property, though with a corresponding tradeoff in compute time and resources needed to generate a geofence. Smaller numbers of perimeter points, meanwhile, may sacrifice some fidelity to the real-life boundaries of a property for increased processing speed in generating the geofence for the property.

For each perimeter point, a distance from the center position 110 may be increased iteratively by a first stride distance D1 until the perimeter point falls outside of the boundaries of property 102. As illustrated, perimeter points 111, 121, 131, 141, 151, 161, 171, and 181 each illustrate a first perimeter point generated based on a value D1 from center position 110. Since each of perimeter points 111, 121, 131, 141, 151, 161, 171, and 181 are within the boundaries of property 102, a second perimeter point may be generated based on a value of 2*D1 from center position 110, illustrated by perimeter points 112, 122, 132, 142, 152, 162, 172, and 182. Since each of perimeter points 114, 124, 134, 144, 154, 164, 174, and 184 are outside of the boundaries of property 102, the first perimeter point may be determined to be the basis from which smaller amounts are added to identify a perimeter point for use in generating geofence 106.

From the first perimeter point, a value D2 may be added to generate another perimeter point (e.g., perimeter points 113, 123, 133, 143, 153, 163, 173, and 183). The value D2, as illustrated, may be calculated as D2=½*D1. For the perimeter points associated with compass headings 000, 090, 180, and 270, illustrated as perimeter points 113, 133, 153, and 173, respectively a map service may indicate that these perimeter points fall within the boundaries of property 102. Thus, operations may terminate, with perimeter points 113, 133, 153, and 173 being deemed the perimeter points to be used for generating geofence 106 around property 102 at their respective directional bearings from center position 110. More generally, a perimeter point may be deemed to be an appropriate perimeter point to use in generating a geofence when a previous perimeter point is associated with a different property than property 102 and a current perimeter point is associated with property 102.

For the perimeter points associated with directional bearings 045, 135, 225, and 315, it may be determined that these perimeter points are outside of the boundaries of property 100, and a smaller amount may be added to the distance D1 to identify another perimeter point for analysis. For example, a new value D3 may be calculated as D3=½*D22, and the new value D3 may be added to perimeter points 122, 142, 162, and 182 to obtain perimeter points 123, 142, 163, and 183, respectively. A map service may indicate that perimeter points 123, 143, 163, and 183 are still outside the boundaries of property, and thus, the process may repeat with a value D4 added to stride distance D1, with D4 calculated as D4=½*D3. In this example, perimeter points 124, 144, 164, and 184 may be generated using value D4. However, because perimeter points 124, 144, 164, and 184 are also outside the perimeter of property 102, another perimeter point can be generated for these directional bearings using a value D5 calculated as D5=½*D4. A map service may indicate that perimeter points 125, 145, 165, and 185 generated using value D5 fall within the boundaries of property 102, and thus, these perimeter points can be used to generate geofence 106.

In some embodiments, a perimeter point along a directional bearing generated after a threshold number of iterations may remain outside of the boundaries of property 102. In such a case, the perimeter point selected for use in generating a geofence 106 may be the last perimeter point generated along the directional bearing. While this perimeter point is outside the boundaries of property 102, the perimeter point may be assumed to be close enough to the boundaries of property 102 to allow for the generation of a reasonably accurate geofence, while saving computing resources that may be spent on further analysis. In another example, the perimeter point selected for use in generating geofence 106 may be the last generated perimeter point that was within the boundaries of property 102. While this perimeter point may not reach the boundary of property 102, it may be assumed to be close enough to the boundary of property 102 to also allow for the generation of a reasonably accurate geofence.

The resulting geofence 106, as illustrated, may more closely approximate the boundaries of property 102 than geofence 104 generated using a radius from a defined position of the property 102. While geofence 106 may not cover the entirety of property 102, geofence 106 may omit a relatively small amount of property 102 while avoiding coverage of significant amounts of space outside of the boundaries of property 102, unlike geofence 104 illustrated in example 100A. It should be recognized that the fidelity of geofence 106 may be further improved by adding additional perimeter points on different compass bearings or directions from the defined position. Generally, as the number of perimeter points increases, the amount of a property covered by the geofence may increase and the amount of a property not covered by the geofence may decrease or remain constant, particularly for irregularly shaped properties.

Figure 2:
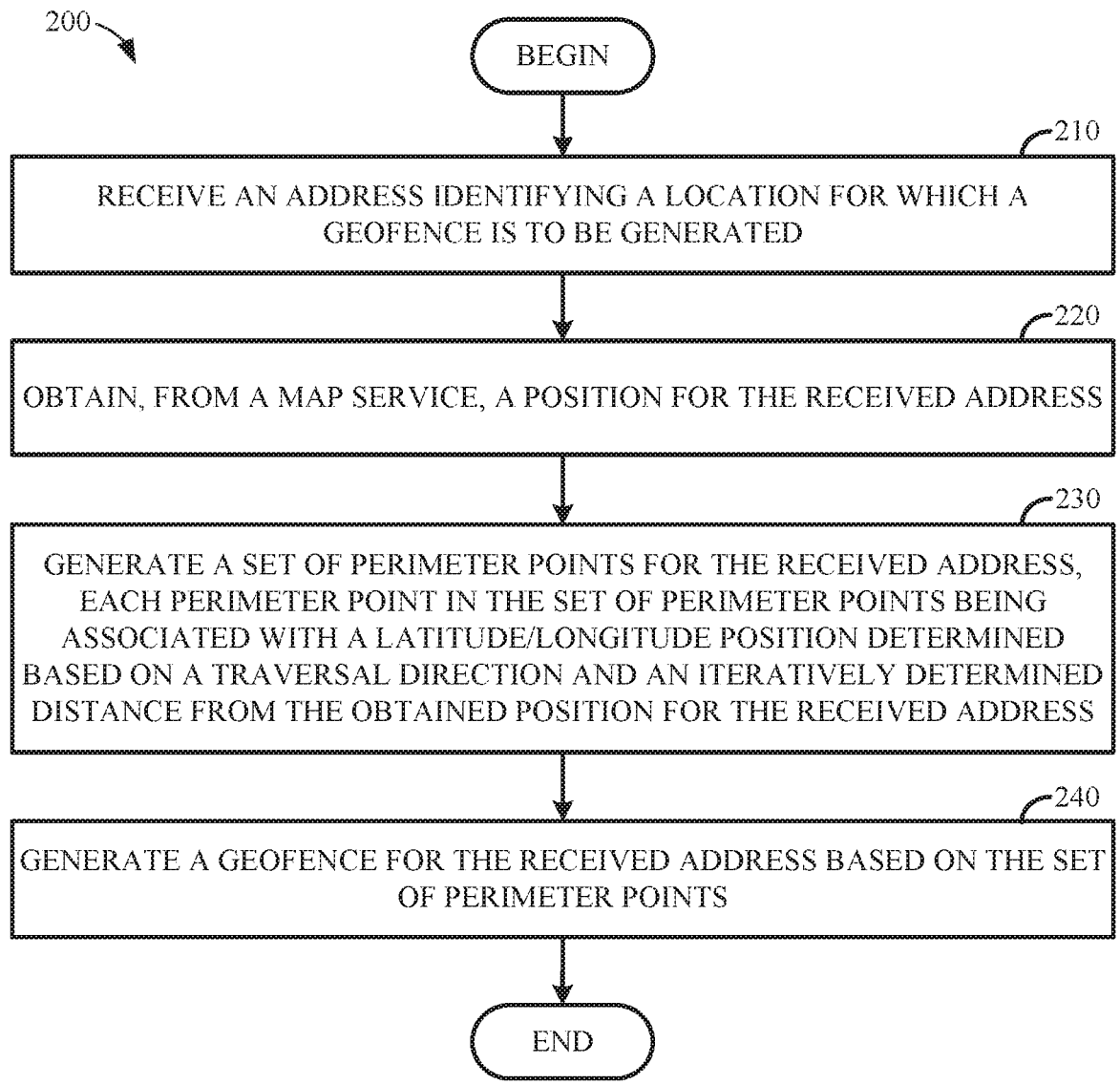
FIG. 2 illustrates example operations for generating a geofence for an address using an iterative process.

Example Operations for Generating Geofences that Approximate Property Boundaries Using an Iterative Process FIG. 2 illustrates example operations 200 that may be performed by a system (e.g., system 700 illustrated in FIG. 7) to generate geofences using an iterative process.

As illustrated, operations 200 begin at block 210, where the system receives an address identifying a location for which a geofence is to be generated. The address may be, for example, a mailing address specified by a user. In some cases, the system can attempt to verify the address against a canonical source of addresses to ensure that the address is a valid address. If the canonical source indicates that the address is not a valid address, the system can suggest corrections to the received address that are valid addresses.

At block 220, the system obtains, from a map service, a position for the received address. Generally, to obtain a position for the received address, the system can query a map service for a latitude/longitude coordinate associated with the received address. The received latitude/longitude coordinate is generally used, as discussed in further detail below, to identify perimeter points that form the perimeter of a geofence around the received address.

At block 230, the system generates a set of perimeter points for the received address. Each perimeter point may be associated with a latitude/longitude point that is determined based on a traversal direction and an iteratively determined distance from the obtained position for the received address. The traversal direction may be a compass bearing along which a perimeter point is to be moved. The distance from the obtained position may be identified iteratively by increasing a distance of the perimeter point from the obtained position for the received address until the perimeter point is located at a different address than the received address.

At block 240, the system generates a geofence for the received address based on the set of perimeter points. Generally, the geofence may be generated using various techniques to connect each of the perimeter points in the set of perimeter points into a polygon. For example, the perimeter points may be connected using the convex hull technique or other techniques.

Figure 3:
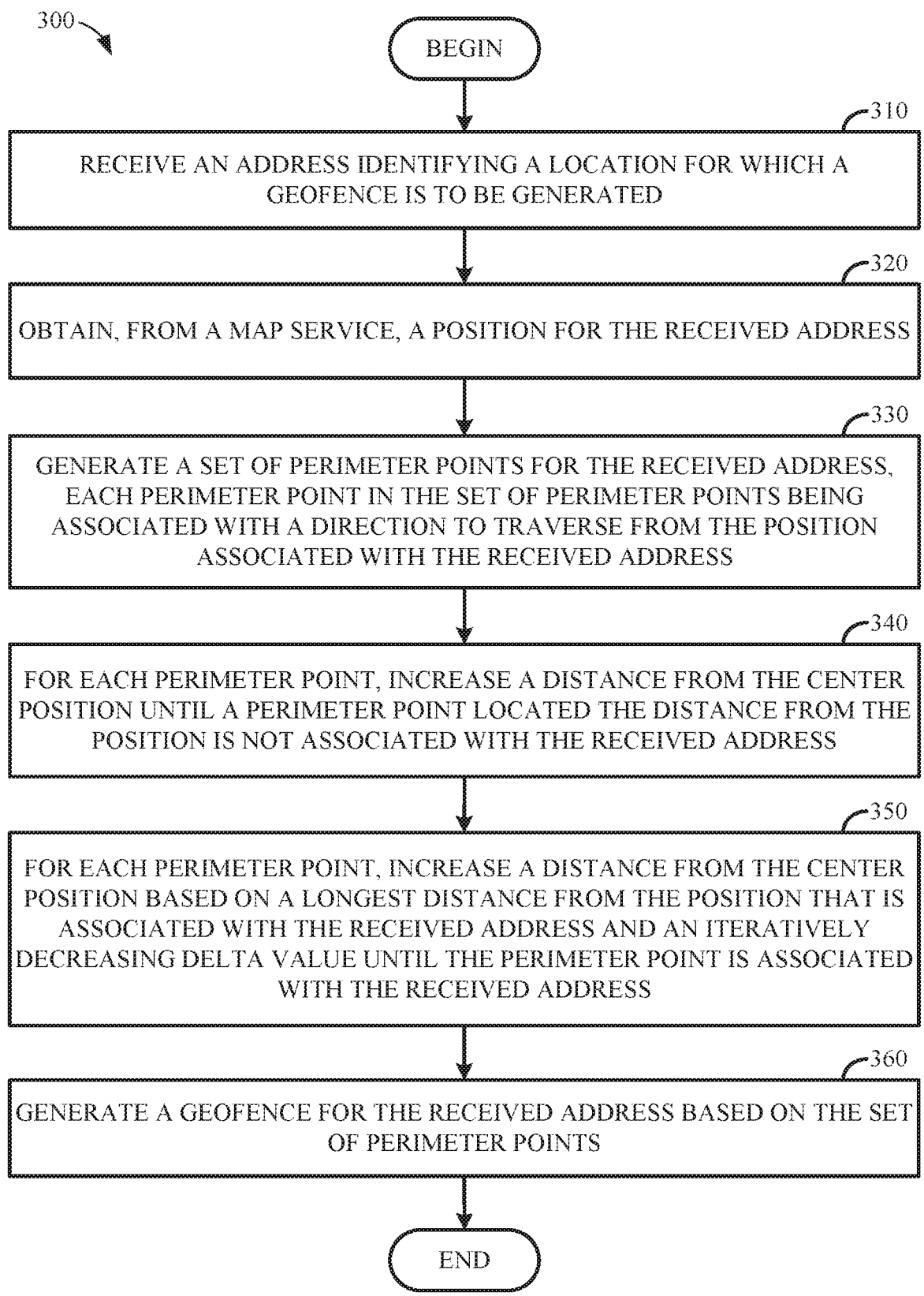
FIG. 3 illustrates example operations for generating a geofence for an address that approximates the boundaries of the property at the address.

FIG. 3 illustrates example operations 300 that may be performed by a system (e.g., system 700 illustrated in FIG. 7) to generate geofences that approximate the boundaries of a property at an address using an iterative process.

As illustrated, operations 300 begin at block 310, where the system receives an address identifying a location for which a geofence is to be generated. The address may be, for example, a mailing address specified by a user. In some cases, the system can attempt to verify the address against a canonical source of addresses to ensure that the address is a valid address. If the canonical source indicates that the address is not a valid address, the system can suggest corrections to the received address that are valid addresses.

At block 320, the system obtains, from a map service, a position for the received address. Generally, to obtain a position for the received address, the system can query a map service for a latitude/longitude coordinate associated with the received address. The received latitude/longitude coordinate is generally used, as discussed in further detail below, to identify perimeter points that form the perimeter of a geofence around the received address.

At block 330, the system generates a set of perimeter points for the received address. Each perimeter point in the set of perimeter points may be associated with a direction to traverse from the position associated with the received address. The number of perimeter points in the set of perimeter points (e.g., the number of directional bearings for which perimeter points are to be identified) may be set based on an expected amount of computation time needed to identify the location of each perimeter point in the set and an amount of fidelity to maintain between the generated geofence and the boundaries of the property at the received address. For example, given a threshold amount of time that may be spent generating a geofence for the property an expected amount of time needed to analyze each perimeter point, and an expected number of perimeter points to be analyzed on each directional bearing, the number of directional bearings for which perimeter points are to be generated may be selected such that the total amount of time spent generating a geofence is less than or equal to the threshold amount of time. Generally, smaller numbers of perimeter points may be used when reductions in computation speed are desired (at the expense of some fidelity to the real-life boundaries of the property associated with the received address), while larger numbers of perimeter points may be used when higher fidelity to the real-life boundaries of the property at the received address is desired.

At block 340, for each respective perimeter point, the system increases a distance from the position until the respective perimeter point is not associated with the received address. Given the location of a position and a directional heading on which a perimeter point is to be generated, the distance from the position to the perimeter point may be iteratively increased until a map service indicates that the perimeter point is associated with an address other than the received address. In some embodiments, the distance between the position and the perimeter point may be increased according to a fixed (or static) delta value (e.g., D1, 2*D1, 3*D1, etc.). In some embodiments, the delta value can decrease with each iteration based on an assumption that each iteration moves the perimeter point closer to the boundaries of a property. In other embodiments, the delta value may increase with each iteration. For example, the first delta value may double for each iteration of a distance calculated by the system. The longest distance from the center point that is associated with the received address may be selected as the basis for which the operations at block 250 are performed, as discussed in further detail below.

At block 350, for each perimeter point, the system increases a distance from the position based on a longest distance from the position that is associated with the received address and an iteratively decreasing second delta value until the perimeter point is associated with the received address. From the selected distance identified at block 240, an initial second delta value may be added to generate a perimeter point. If the perimeter point is still associated with an address that is different from the received address, successively smaller second delta values may be added to the selected distance. In some embodiments, the second delta value may be decreased by half for each iteration that is executed until the perimeter point is within the geographic boundaries of the property associated with the received address.

At block 360, the system generates a geofence for the received address based on the set of perimeter points. Generally, the geofence may be generated using various techniques to connect each of the perimeter points in the set of perimeter points into a polygon. For example, the perimeter points may be connected using the convex hull technique or other techniques.

In some embodiments, a number of perimeter points in the set of perimeter points is determined based on a degree of fidelity to maintain for the generated geofence and a processing overhead threshold for generating the geofence around the received address. The degree of fidelity to maintain for the generated geofence may be a relative amount, such as "low", "medium", and "high", and each degree of fidelity may be associated with a different number of perimeter points. The degree of fidelity may be selected, for example, based on the amount of time estimated to be spent in identifying a boundary of a property for the number of perimeter points associated with each degree of fidelity.

In some embodiments, the system may retrieve, from a database, information about a type of property located at the received address. The database may be, for example, a database that maintains zoning information for a plurality of addresses. The first delta value may be determined based on the information about the type of property located at the received address. For example, it may be assumed a priori that properties zoned for residential use are smaller than properties zoned for commercial use. Based on this assumption, the first delta value used to generate a geofence may be larger for commercial properties than for residential properties.

In some embodiments, the first delta value may be additionally or alternatively determined based on an area for which geofences are being generated. For example, smaller delta values may be used to generate geofences for properties in dense urban environments where the parcel size of any given property can be assumed to be relatively small. Meanwhile, larger delta values may be used to generate geofences for properties in less densely built areas where the parcel size of any given property can be assumed to be somewhat larger than those in a dense urban environment.

In some embodiments, decreasing the second delta value to add to the selected distance includes determining a last value of the second delta value, and decreasing the last value by half. Decreasing the second delta value to add to the selected distance may terminate when the second delta value is less than or equal to a predetermined stopping distance.

In some embodiments, the system can generate a user-specific geofence by expanding, for a user of an application, the generated geofence by a user-defined distance. These user-specific geofences may encompass an area outside the boundaries of a property to allow users of the user-specific geofences to automatically perform operations when these users are a threshold distance away from the property for which the geofence was generated, such as automated time tracking, automated check in, and the like. To do so, the system obtains a set of perimeter coordinates associated with the geofence and adds the user-defined distance to each perimeter coordinate in the set of perimeter coordinates based on a direction of each perimeter coordinate from the center coordinate.

Figure 4:
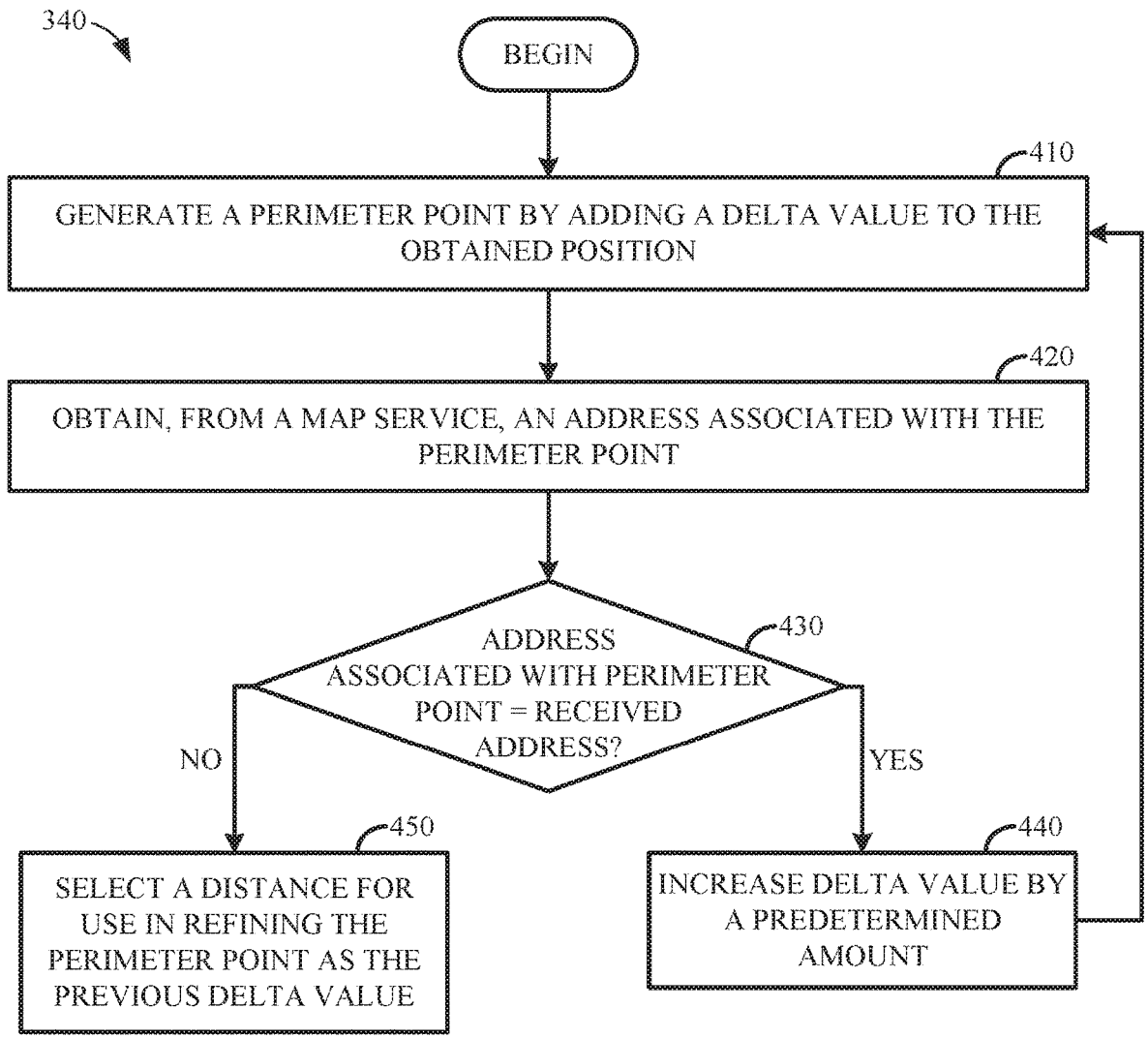
FIG. 4 illustrates further details of identifying a distance to use in iteratively finding a perimeter point for a geofence that approximates the boundaries of a property at an address.

FIG. 4 illustrates further details of example operations 340 illustrated in FIG. 3 to increase a distance from the position for each perimeter point in a set of perimeter points.

As illustrated, operations 340 begin at block 410, where a system generates a perimeter point by adding a delta value to the position. As discussed, the delta value may be added such that the resulting perimeter point is a distance away from the position along a given directional bearing from the position.

At block 420, the system obtains, from a map service, an address associated with the perimeter point.

At block 430, the system determines whether the address associated with the perimeter point is identical to the received address. If the address associated with the perimeter point is identical to the received address, this indicates that the perimeter point is within the boundaries of the property associated with the received address. Thus, operations 340 proceed to block 440, where the delta value is increased by a predetermined amount. For example, the delta value may be doubled, incremented by the original amount of the delta value, or otherwise scaled such that the value of the delta value monotonically increases as the number of intervals executed increases. Operations 340 may return to block 410, where a new perimeter point is generated by adding the new delta value to the position.

If, however, at block 430, the system determines that the address associated with the perimeter point is not identical to the received address, it can be determined that the perimeter point is no longer within the boundaries of the property associated with the received address (i.e., the perimeter point is within the boundaries of a different property). Thus, operations 340 proceed to block 450, where the system selects the previous delta value as the distance to use in refining the perimeter point. The previous delta value may correspond to the largest distance identified that results in a boundary point that is still within the boundary of the property for which a geofence is being generated.

Figure 5:
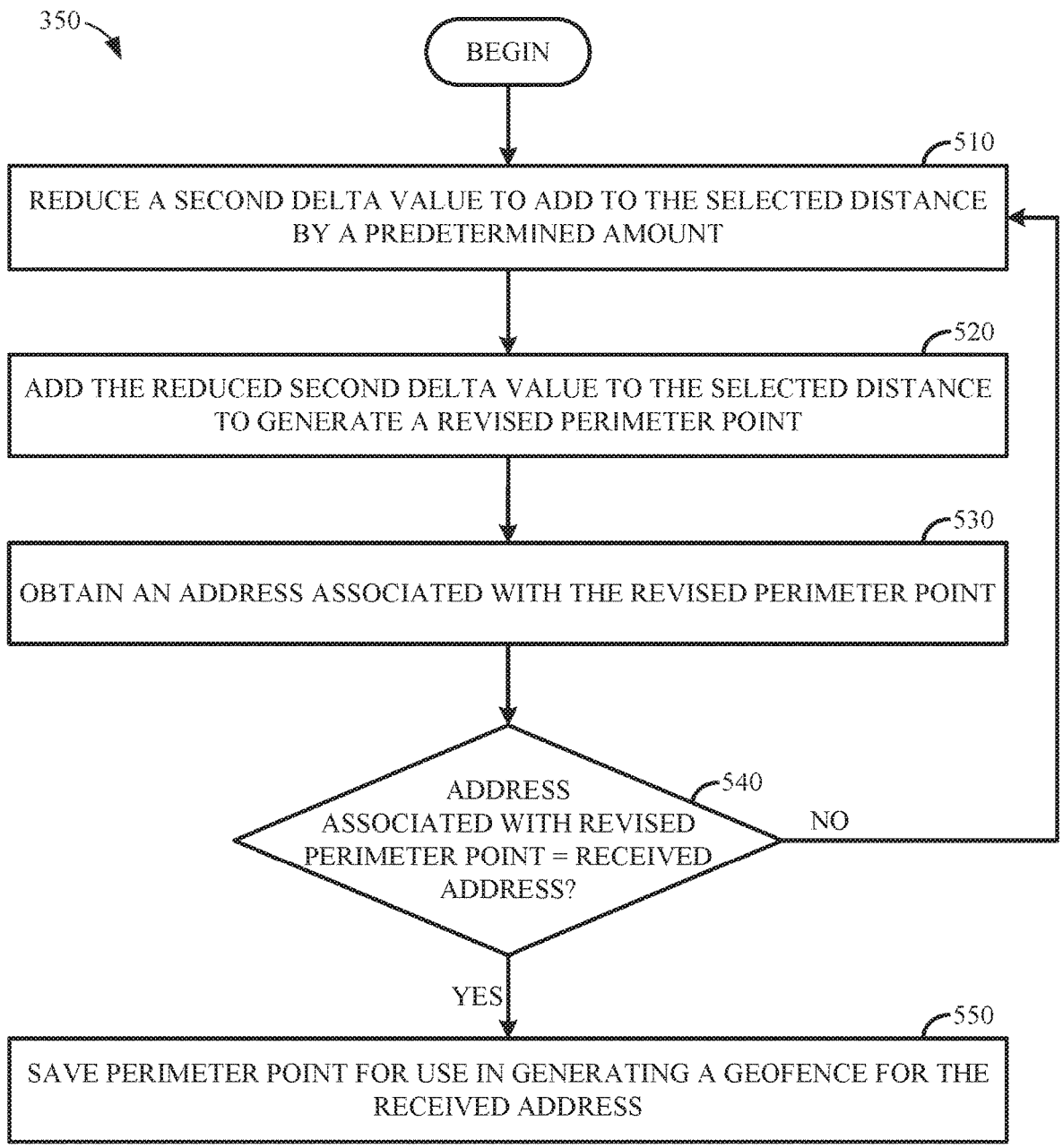
FIG. 5 illustrates further details of identifying a second distance to use in iteratively find a perimeter point from a selected distance from a position of an address.

FIG. 5 illustrates further details of example operations 350 illustrated in FIG. 3 to increase a distance from the position for each perimeter point in a set of perimeter points based on a selected distance and an iteratively decreasing delta value.

As illustrated, operations 350 begin at block 510, where the system reduces a second delta value to add to the selected distance by a predetermined amount. As discussed, the initial value of the second delta value may be a value that is smaller than a first delta value used to iterative identify the selected distance (e.g., as discussed with respect to FIG. 4 above). In some embodiments, the system can decrease the second value by a fixed amount. In some embodiments, the system can decrease the second value by half for each iteration executed.

At block 520, the system adds the reduced second delta value to the selected distance to generate a revised perimeter point. The resulting revised perimeter point may thus be located along a compass heading associated with the perimeter point a total distance from the position that is the sum of the selected distance and the second delta value.

At block 530, the system obtains, from a map service, an address associated with the revised perimeter point.

At block 540, the system determines whether the address associated with the revised perimeter point is identical to the received address. If the address associated with the revised perimeter point is identical to the received address, it may be determined that the perimeter point has moved from outside of the boundaries of the property associated with the received address to inside the boundaries of the property associated with the received address. Thus, operations 350 may proceed to block 550, where the system saves the revised perimeter point for use in generating a geofence for the received address.

Otherwise, if at block 540, the system determines that the address associated with the revised perimeter point does not match the received address, the system can determine that a smaller second delta value may need to be generated. Thus, operations 350 return to block 510, and the operations 350 repeat until a second delta value is identified that results in a perimeter point that is inside the boundaries of the received address or the second delta value reaches a predetermined minimum value.

Example Data Used in Identifying a Perimeter Point for Generating a Geofence that Approximates the Boundaries of a Property at an Address Using an Iterative Process FIG. 6 illustrates an example data set that may be used to generate a perimeter point for generating a geofence that approximates the boundaries of a property at an address using an iterative process, as discussed herein.

As illustrated, a user wishes to generate a geofence around the property located at 1400 Bronco Ln, Boise, Id. 83706. The map service associates this address with a center latitude of 43.6028387° and a center longitude of −116.1967873°. In this example, the perimeter point is being generated on a directional bearing of 000; however, it should be recognized that the process illustrated herein may be replicated for perimeter points along any compass heading.

A first perimeter point may be generated with a distance of 10 feet from the identified center point, resulting in a perimeter point with a latitude position of 43.60283981° and a longitude position of −116.1967873°. The map service indicates that this latitude/longitude position is associated with the address 1400 Bronco Ln, Boise, Id. 83706. Thus, the distance may be increased.

As illustrated, the distance from the center point doubles for each iteration of a perimeter point that is generated, until the perimeter point is no longer associated with the received address of 1400 Bronco Ln, Boise, Id. 83706. That is, the perimeter point may be analyzed at 20 feet, 40 feet, 80 feet, 160 feet, 320 feet, 640 feet, 1280 feet, and 2560 feet. At 2560 feet away from the center coordinate on a northerly heading, the map service indicates that the perimeter point is now associated with the address 1910 W University Dr., Boise, Id. 83706. Because this address is not the received address, the system can select the previous distance from the center point as the basis on which the distance may be refined using an iteratively decreasing second delta value.

The second delta value may be initially set to a value that is half of the value added to the selected distance that resulted in generation of a perimeter point that is outside of the boundaries of the property associated with the received address. In this example, since the first delta value increased by 1280 feet, the initial second delta value may be set to half of the increase, or 640 feet. At 1920 feet from the center position, the map service may indicate that the perimeter point is still associated with an address other than the received address. Thus, the second delta value may be decreased continually until a second delta value is identified that, when added to the selected distance to generate a perimeter point, results in the perimeter point being associated with the received address. In this example, the second delta value may be 80 feet, resulting in a perimeter point that is 1360 feet away from the center position along a directional bearing of 000.

Figure 7:
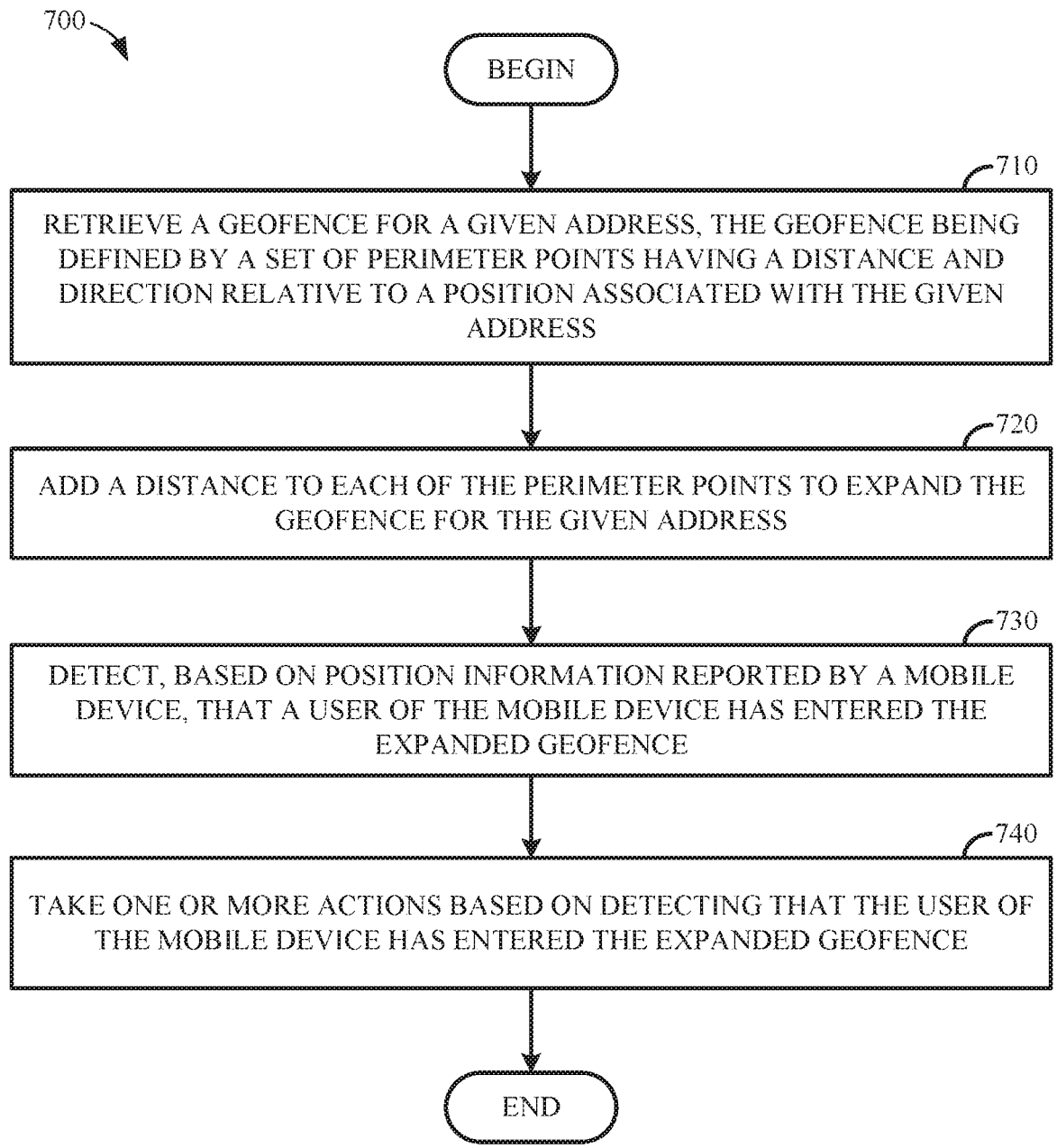
FIG. 7 illustrates example computer-implemented operations for performing an action based on reported position information from a mobile device and a geofence that approximates the boundaries of a property at an address.

Example Operations for User Tracking Based on Geofences that Approximate the Boundaries of a Property at an Address FIG. 7 illustrates example operations 700 that may be performed to initiate user tracking based on a geofence approximating the boundaries of a property at an address generated using the iterative processes described herein.

As illustrated, operations 700 begin at block 710, where the system retrieves a geofence for a given address. The geofence may be defined by a set of perimeter points having a distance and direction relative to a position associated with the given address. Each perimeter point in the set of perimeter points may be identified using an iterative process that determine the distance from the position using an iteratively increasing distance from the center point to identify a distance that results in a perimeter point associated with the given address and using an iteratively decreasing delta to add to the identified distance to extend the perimeter point to a location closer to the real-life boundaries of the property associated with the given address.

At block 720, the system adds a distance to each of the perimeter points. By adding a distance to each of the perimeter points, the system can expand the geofence for the given address. Generally, the distance added to each of the perimeter points may be defined, for example, by a user who wishes to generate and use a geofence for a specific application.

For example, in an automated time tracking system, the geofence may be expanded by an amount to allow for automated initiation of time tracking when a user parks in a parking lot outside of the boundaries of a property so that the user is credited with an amount of time taken to walk from the parking lot to a building. In a messaging system, the geofence may be expanded to allow for the generation and transmission of messages to users of a mobile device who are approaching a property, which may allow for advertising or other messages to be delivered prior to a recipient arriving at a property or needing to be inside the boundaries of a property in order to receive these messages.

At block 730, the system detects, based on position information reported by a mobile device, that a user of the mobile device has entered the expanded geofence. Generally, the system can compare the position information reported by the mobile device against the boundaries of the expanded geofence.

At block 740, the system takes one or more actions based on detecting that the user of the mobile device has entered the expanded geofence.

In some embodiments, the determination that the received location information is within the geofence may be a determination that the received location is no greater than a threshold distance away from a perimeter of the geofence. Generally, by determining that the received location is no greater than a threshold distance away from a perimeter of the geofence, the system can account for positional inaccuracies that may be inherent to position information determined from a satellite positioning system receiver on the mobile device.

In some embodiments, taking one or more actions to initiate user tracking may include determining, based on previously recorded tracking information associated with the user that the user is eligible for automatic recording of time spent inside the geofence. The system may start a timer to track an amount of time the user has spent inside the geofence. The system may, at a later point in time, determine, based on subsequently received location information received from the mobile device, that the user has exited the geofence. Based on this determination, the system can stop the timer. Generally, when the timer is stopped, the system can generate a record including information about when the timer was started and stopped, a total amount of time elapsed between the timer starting and stopping, and other relevant information.

Figure 8:
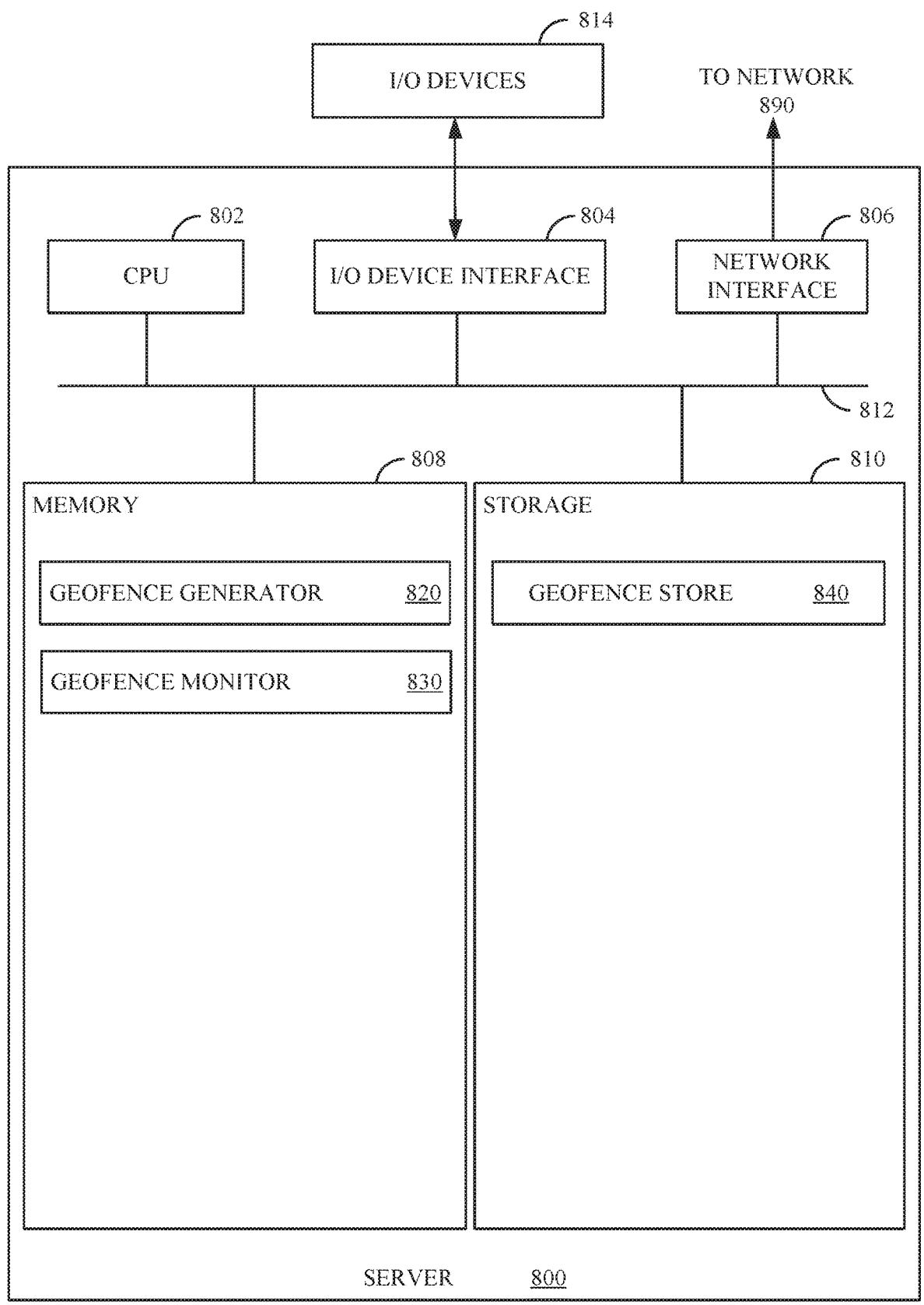
FIG. 8 illustrates an example computing system with which embodiments of the present disclosure may be implemented.

Example Systems for Generating Perimeter Accurate Geofences Using an Iterative Process FIG. 8 illustrates an example system 800 that generates perimeter-accurate geofences using an iterative process.

As shown, server 800 includes a central processing unit (CPU) 802, one or more I/O device interfaces 804 that may allow for the connection of various I/O devices 814 (e.g., keyboards, displays, mouse devices, pen input, etc.) to the server 800, network interface 806 through which server 800 is connected to network 890 (which may be a local network, an intranet, the internet, or any other group of computing devices communicatively connected to each other), a memory 808, storage 810, and an interconnect 812.

CPU 802 may retrieve and execute programming instructions stored in the memory 808. Similarly, the CPU 802 may retrieve and store application data residing in the memory

808. The interconnect 812 transmits programming instructions and application data, among the CPU 802, I/O device interface 804, network interface 806, memory 808, and storage 810.

CPU 802 is included to be representative of a single CPU, multiple CPUs, a single CPU having multiple processing cores, and the like.

Memory 808 is representative of a volatile memory, such as a random access memory, or a nonvolatile memory, such as nonvolatile random access memory, phase change random access memory, or the like.

As shown, memory 808 includes a geofence generator 820 and a geofence monitor 830. Geofence generator 820 generally receives an address of a property for which a geofence is to be generated. Using a position retrieved from a map service (e.g., through one or more messages sent to a remote computing device via network interface 806), geofence generator 820 generates a set of perimeter points for use in building the geofence. The set of perimeter points may be a set of points each being associated with a direction or heading relative to the position. Geofence generator 820 can iteratively increase a distance for each perimeter point in the set of perimeter points from the position using a first delta value until the perimeter point associated with a given distance is associated with an address that is different from the received address. From a greatest distance that is still associated with the received address, an iteratively decreasing delta is added until the resulting perimeter point is associated with the received address. Geofence generator uses the set of perimeter points to generate a geofence for the received address and may store a definition of the geofence in geofence store 840 or in a remote location.

Geofence monitor 830 generally uses a definition of a geofence and reported positional information from a mobile device to determine whether a user of the mobile device is inside or outside of a geofence and take action based on the determination. In some embodiments, geofence monitor 830 can expand the geofence associated with a given address by a user-specified distance. When position information reported from a mobile device is within the expanded geofence, geofence monitor 830 can initiate user tracking, and when position information reported from the mobile device indicates that the mobile device has exited the expanded geofence, geofence monitor 830 can discontinue user tracking and generate a record including information about the period of time in which the user was within the geofence for the given address.

Storage 810 is representative of a non-volatile memory, such as a disk drive, solid state drive, or a collection of storage devices distributed across multiple storage systems. Although shown as a single unit, the storage 810 may be a combination of fixed and/or removable storage devices, such as fixed disc drives, removable memory cards or optical storage, network attached storage (NAS), or a storage area-network (SAN).

Storage 810, as illustrated, may include a geofence store 840. Geofence store 840 generally represents a repository in which definitions of geofences for different addresses may be stored. A definition of a geofence may be stored as a set of perimeter points associated with a given address, and the set of perimeter points may be returned to geofence monitor 830 in response to a query against geofence store 840 for the geofence associated with a given address.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for generating a geofence iteratively from a position associated with an address, comprising:
   receiving an address to generate a geofence around;
   obtaining, from a map service, a position associated with the received address;
   generating a set of perimeter points for the received address, wherein each perimeter point is associated with a latitude and longitude position determined based on a traversal direction and an iteratively determined distance from the obtained position associated with the received address, wherein generating the set of perimeter points for the received address comprises, for each perimeter point in the set of perimeter points:
      until the map service indicates that the perimeter point is associated with an address that is different from the received address:
         increasing a distance from the obtained position based on a first delta value,
         moving the perimeter point based on the distance from the obtained position and the traversal direction associated with the perimeter point, and
         obtaining, from the map service, an indication of a first address associated with the perimeter point,
      selecting a distance as a distance from the obtained position having a longest distance from the obtained position and being associated with the received address, and
      until the map service indicates that the perimeter point is associated with the received address;
         decreasing a second delta value to add to the selected distance,
         moving the perimeter point based on the selected distance, the second delta value, and the direction to traverse associated with the perimeter point, and
         obtaining, from the map service, an indication of a second address associated with the perimeter point;

generating the geofence for the received address based on the set of perimeter points; and deploying the generated geofence to a mobile device for use in a location tracking application executing on the mobile device.

2. The method of claim 1, wherein a number of perimeter points in the set of perimeter points is selected from a set of numbers, each number being associated with a degree of fidelity to maintain for the generated geofence and a processing overhead for generating the geofence around the received address.

3. The method of claim 1, further comprising: retrieving, from a database, information about a type of property located at the received address, wherein the first delta value is determined based on the information about the type of property located at the received address.

4. The method of claim 1, wherein increasing the distance from the obtained position based on a first delta value comprises doubling the first delta value for each iteration until the map service indicates that the perimeter point is associated with an address that is different from the received address.

5. The method of claim 1, wherein decreasing the second delta value to add to the selected distance comprises:
determining a last value of the second delta value; and
decreasing the last value of the second delta value by half.

6. The method of claim 1, wherein decreasing the second delta value to add to the selected distance terminates when the second delta value is less than or equal to a predetermined stopping distance.

7. The method of claim 1, further comprising:
generating a user-specific geofence by expanding, for a user of an application, the generated geofence by a user-defined distance by:
obtaining a set of perimeter coordinates associated with the geofence, and
adding the user-defined distance to each perimeter coordinate in the set of perimeter coordinates based on a direction of each perimeter coordinate from the obtained position.

8. A system, comprising:
a processor; and
a memory having instructions stored thereon which, when executed by the processor, performs an operation for generating a geofence iteratively from a center position associated with an address, the operation comprising:
receiving an address to generate a geofence around;
obtaining, from a map service, a center position associated with the received address;
generating a set of perimeter points for the received address, wherein each perimeter point is associated with a latitude and longitude position determined based on a traversal direction and an iteratively determined distance from the obtained position associated with the received address, wherein generating the set of perimeter points for the received address comprises, for each perimeter point in the set of perimeter points:
unit the map service indicates that the perimeter point is associated with an address that is different from the received address:
increasing a distance from the obtained position based on a first delta value,
moving the perimeter point based on the distance from the obtained position and the traversal direction associated with the perimeter point, and
obtaining, from the map service, an indication of a first address associated with the perimeter point,
selecting a distance as a distance from the obtained position having a longest distance from the obtained position and being associated with the received address, and
until the map service indicates that the perimeter point is associated with the received address;
decreasing a second delta value to add to the selected distance,
moving the perimeter point based on the selected distance, the second delta value, and the direction to traverse associated with the perimeter point, and
obtaining, from the map service, an indication of a second address associated with the perimeter point;
generating the geofence from the received address based on the set of perimeter points; and
deploying the generated geofence to a mobile device for use in a location tracking application executing on the mobile device.

9. The system of claim 8, wherein a number of perimeter points in the set of perimeter points is selected from a set of numbers, each number in the set of numbers being associated with a degree of fidelity to maintain for the generated geofence and a processing overhead for generating the geofence around the received address.

10. The system of claim 8, wherein the operation further comprises: retrieving, from a database, information about a type of property located at the received address, wherein the first delta value is determined based on the information about the type of property located at the received address.

11. The system of claim 8, wherein increasing the distance from the obtained position based on a first delta value comprises doubling the first delta value for each iteration until the map service indicates that the perimeter point is associated with an address that is different from the received address.

12. The system of claim 8, wherein decreasing the second delta value to add to the selected distance comprises:
determining a last value of the second delta value; and
decreasing the last value of the second delta value by half.

13. The system of claim 8, wherein decreasing the second delta value to add to the selected distance terminates when the second delta value is less than or equal to a predetermined stopping distance.

14. The system of claim 8, wherein the operation further comprises:
generating a user-specific geofence by expanding, for a user of an application, the generated geofence by a user-defined distance by:
obtaining a set of perimeter coordinates associated with the geofence, and
adding the user-defined distance to each perimeter coordinate in the set of perimeter coordinates based on a direction of each perimeter coordinate from the obtained position.

15. A computer-implemented method for tracking user activity based on iteratively generated geofences, comprising:
receiving, from a mobile device associated with a user of an application, location information identifying a location of the user;

comparing the received location information to an area within a geofence, the geofence having been generated by:
  obtaining, from a map service, a center coordinate associated with an address,
  generating a set of perimeter points for the address, each perimeter point in the set of perimeter points being associated with the with a direction to traverse from the center coordinate associated with the address, and
  for each perimeter point in the set of perimeter points, iteratively increasing a distance from the center coordinate by a first delta to find a first distance from the center coordinate that is still associated with the address and iteratively increasing the first distance by a decreasing second delta to until an address associated with the perimeter point changes back to the address, and
  generating the geofence for the address based on the set of perimeter points; and
based on a determination that the received location information is within the geofence, taking one or more actions to initiate user tracking.

16. The method of claim 15, wherein the determination that the received location information is within the geofence comprises a determination that the location of the user is no greater than a threshold distance away from a perimeter of the geofence.

17. The method of claim 15, wherein the taking one or more actions to initiate user tracking comprises:
  determining, based on previously recorded tracking information associated with the user, that the user is eligible for automatic recording of time spent inside the geofence; and
  starting a timer to track an amount of time the user has spent inside the geofence.

18. The method of claim 17, further comprising:
  determining, based on subsequently received location information received from the mobile device, that the user has exited the geofence; and
  stopping the timer.

19. The method of claim 15, wherein a number of perimeter points in the set of perimeter points comprises a number selected from a set of numbers, each number in the set of numbers being associated with a degree of fidelity to maintain for the generated geofence.

20. The method of claim 15, further comprising: generating a user-specific geofency by expanding the geofence by a user-defined distance relative to the set of perimeter points associated with the address.

* * * * *